W. A. UTTZ.
WIND SHIELD PROTECTOR.
APPLICATION FILED APR. 12, 1915.
1,186,865.
Patented June 13, 1916.
2 SHEETS—SHEET 1.
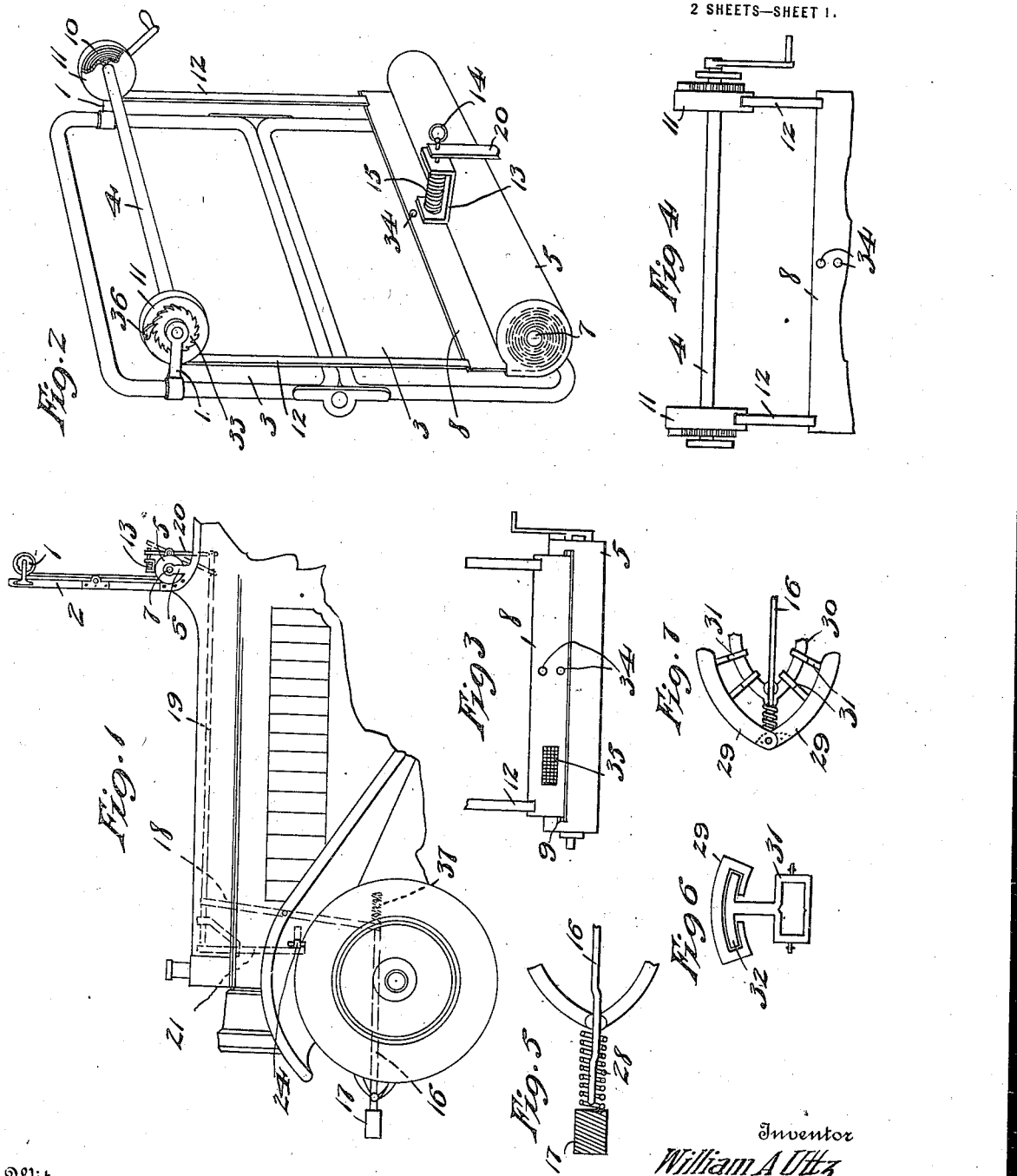
Witness
B. J. Lorkowski
Inventor
William A Uttz
By A. L. Jackson
Attorney

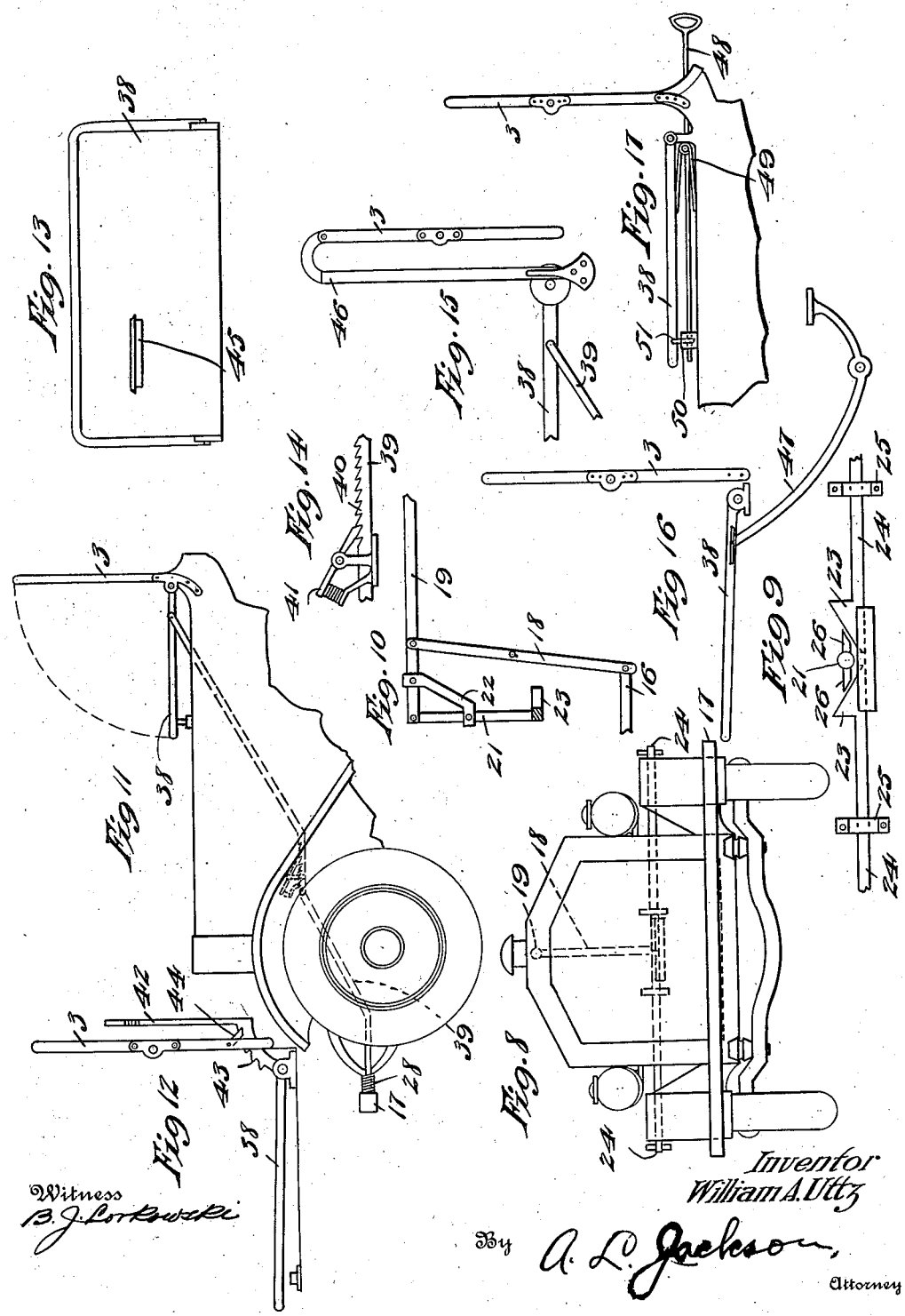

UNITED STATES PATENT OFFICE.

WILLIAM A. UTTZ, OF FORT WORTH, TEXAS.

WIND-SHIELD PROTECTOR.

1,186,865.   Specification of Letters Patent.   Patented June 13, 1916.

Application filed April 12, 1915. Serial No. 20,602.

*To all whom it may concern:*

Be it known that I, WILLIAM A. UTTZ, a citizen of the United States, residing at Fort Worth, in the county of Tarrant and State of Texas, have invented certain new and useful Improvements in Wind-Shield Protectors, of which the following is a specification.

My invention relates to safety devices or attachments for automobiles and more particularly to devices which will protect people from the danger of broken glass from the wind-shields of automobiles or from such constructions as the vestibules of street cars and which will also prevent people from being thrown against such constructions as wind-shields; and the object is to provide simple devices at small expense which can be readily attached to such vehicles as street cars, automobiles, and other moving vehicles for the protection of people or chauffeurs from being cut and seriously injured by the broken glass.

Other objects and advantages will be fully explained in the following description and the invention will be more particularly pointed out in the claims.

Reference is had to the accompanying drawings which form a part of this application.

Figure 1 is a side elevation of a part of an automobile, showing the improvements applied thereto. Fig. 2 is a perspective view, showing the relative positions of the attachments and the windshield. Fig. 3 is a detail view of the attachment, showing how the attachment is to be inclosed in a casing when not in use. Fig. 4 is a detail view, showing the manner of winding the attachment and unwinding the same. Fig. 5 is a detail view of the devices which are to be actuated by the guard-rail of the vehicle for automatically raising the safety device. Fig. 6 is a detail view of actuating attachments and a protecting device for use in cases where the vehicles have no guard-rails. Fig. 7 is a plan view of the devices shown in Fig. 6. Fig. 8 is a front view of an automobile, showing the devices to be actuated from the sides of the car in case of accident. Fig. 9 is a plan view of the same devices. Fig. 10 is a side elevation of the same. Fig. 11 is a side elevation of a portion of an automobile, showing a variation in the form and position of the safety attachments. Fig. 12 is a detail view, showing one manner of operating such attachment as shown in Fig. 11. Fig. 13 is a front view of the form of the device shown in Figs. 11 and 12. Fig. 14 is a detail view of the ratchet locking devices shown in Fig. 11. Fig. 15 is a detail view, showing a variation in the manner of operating the form of the device shown in Fig. 11. Fig. 16 is a detail view, showing another mechanism for operating the form of the safety device shown in Fig. 11. Fig. 17 is a detail view, showing another variation in the mechanism for operating the safety device shown in Fig. 11.

Similar characters of reference are used to indicate the same parts throughout the several views.

The improvement is shown attached to an automobile for convenience in illustrating the invention and as showing one mode of using the device. Brackets 1 are mounted on the frame 2 of the wind-shield 3. These brackets support a shaft 4. A cylindrical casing 5 is provided and attached to brackets 6 which are attached to the frame or body of the car. A shaft 7 is journaled in the brackets 6. A rollable sheet 8 of metal or fabric or composition of fabric and wire or leather or other belting material is normally wound on the shaft 7 within the casing 5 which has a slot 9 for the passage of the protector 8. Barrel springs 10 are mounted in casings 11 which are rigid with the wind-shield 3, one end of each spring being attached to the shaft 4 and the other end attached to the casing 11, constituting barrel springs. Flexible straps 12 are attached to the winding shaft 4 and to the edge of the protector 8. When the protector 8 is wound on the shaft 7 within the casing 5, the straps 12 will turn the shaft 4 and wind the springs 10 to tension. Means are provided for locking the protector down in the casing 5. A bracket 13 is attached to the casing 5. A spring-actuated rod 14 is slidably mounted in the bracket 13, the rod being held normally projected over the upper edge of the protector by a spring 15 to hold the protector down so that the protector will remain in the casing 5 until it is to be used.

Means are provided for drawing the rod 4 away from the protector 8 in time of danger for releasing the protector. As soon as the protector 8 is released, the springs 10 will draw it up to cover the wind-shield and thus protect the person behind the wind-shield. A push rod 16 is slidably mounted on the car and bears against the guard rail 17, and is pivotally connected with a lever 18 which is fulcrumed on the automobile and pivotally connected to a sliding bar 19 which is pivotally connected to a lever 20. The lever 20 is connected to the rod 14 and when there is a bump against the guard rail, the lever 20 will draw the sliding rod 14 off the top of the protector so that the protector will instantly rise up to cover the wind-shield 3. Provision is also made for operating the rod 19 from either side of a car. A rod 21 is connected to the rod 19 and rigidly braced therewith by the bar 22. The rod 21 is actuated by wedges 23 which have shanks 24 slidably mounted in brackets 25 and projecting on each side of the car. If any object strikes either one of the shanks 24, the rod 21 will be forced backward, carrying the rod 19. The rod 21 is provided with wings 26 against which the wedges 23 will impinge. A spring 28 will restore the rod 16 to its normal position and hold the same ready for action.

If there is no guard rail in front of the car a shield 29 is mounted in front of the spring 30 of the car by means of yokes 31 which have shoes 32 that run in the shield members 29. The yokes engage the spring 30 for holding the shield 29 in place. The operation of the rod 16 will be the same as when a guard rail is used. The operation of the protector 8 has been fully described. The protector may be held at different elevations by providing a plurality of perforations 34 through which the rod 14 may project. The rod 14 may be manually operated as well as by the mechanism above described. A window 35 may be provided in the protector 8 so that the driver or chauffeur can see where to direct his car. This opening may be protected by a screen, as shown in Fig. 3. A ratchet 33 and a dog 36 may be provided to hold the protector 8 at different adjustments, and also for regulating or tightening the tension of the barrel springs 10. A spring 37 may be provided to restore the rod 16 to normal position.

Figs. 12 to 17 show variations in the protector and variations in mechanisms for operating the same. The protector 38 is hinged at its edge to the hood of the car and is adapted to swing upwardly and cover the wind-shield 3. The form shown in Fig. 11 includes a push rod 39. This rod operates in the same manner as the rod 16 with the spring 28 and the guard rail 17, but this rod extends to the protector 38 and is pivotally connected thereto so that when there is a bump on the guard rail 17, the protector 38 will be swung up in front of the wind-shield 3. A rack 40 is formed on the rod 39 and a dog 41 is provided for holding the rod 39 at different positions as may be desired, and acts as a lock to hold the bar 39 at whatever position it may stop and thus prevent the bar 39 from slipping back to normal position before it performs its function.

Fig. 12 shows a similar protector provided with a lever 42 for manually operating the protector. A rack 43 and a dog 44 are used to lock the protector 38 in different positions. The protector 38 is provided with a window 45. The protector 38 may be made of sheet metal or other suitable material.

In the form of the device shown in Fig. 15, a frame 46 is shown in front of the wind-shield to receive the protector 38.

In the form shown in Fig. 16, a foot lever 47 is provided for operating the protector 38. In the form of the device as shown in Fig. 17 a rod 48 is provided for locking the protector 38 down. A spring 49 is shown for elevating the protector 38 as soon as it is released. A bracket 50 is attached to the car and a loop 51 carried by the protector extends down in the bracket 50 and the rod 48 locks the loop 51 down in the bracket 50 and as soon as the rod 48 is drawn out, the spring 49 will raise the protector up to cover the wind-shield.

All the forms of the protectors can be automatically operated with such devices as shown in Figs. 1, 2, and 11, and the form shown in Figs. 1 and 2 may be placed on either side of the wind-shield.

What I claim, is:—

1. In a vehicle provided with a wind-shield, a safety device mounted on the vehicle adjacent to the lower edge of said wind-shield, means for elevating said safety device adjacent to the wind-shield of the vehicle in a plane parallel thereto and substantially co-extensive therewith, and means for holding the shield down in the lowered position.

2. A safety device for vehicles comprising a shield substantially co-extensive with the wind-shield of the vehicle, means for normally holding said shield away from the wind-shields of the vehicle, and means operatively connected with the vehicle for automatically moving the said shield to a position parallel to the face of the wind-shield.

3. A safety device for vehicles comprising a shield consisting of a rollable sheet, means for holding said sheet normally away from the wind-shield of the vehicle, means for automatically releasing said holding means, and means for automatically placing said shield adjacent to the wind-shield of the vehicle as soon as released.

4. A safety device for vehicles comprising a shield consisting of a rollable sheet, means for holding said sheet normally away from the wind-shield of the vehicle, a spring-actuated shaft connected with the wind-shield, flexible straps connected to said shaft and to said sheet, and means for automatically releasing said holding means.

5. A safety device for vehicles comprising a shield consisting of a rollable sheet, a cylindrical casing, a shaft journaled in said casing, means for winding said sheet on said shaft, a spring-actuated shaft, flexible straps attached to said sheet and to said spring-actuated shaft, a locking member normally locking said sheet in said cylinder, and means positioned on the vehicle and operatively connected with said locking member for automatically releasing said locking member when said means strikes an obstruction.

In testimony whereof, I set my hand in the presence of a witness, this 7th day of April, 1915.

WILLIAM A. UTTZ.

Witness:
J. W. STITT.